United States Patent
Arai et al.

(10) Patent No.: US 8,541,976 B2
(45) Date of Patent: Sep. 24, 2013

(54) VEHICLE MOUNTED PERSONAL DEVICE BATTERY CHARGING STATION AND OPERATING METHODS TO AVOID INTERFERENCE

(75) Inventors: Hideaki Arai, Powell, OH (US); Jason David DiSalvo, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 360 days.

(21) Appl. No.: 13/113,285

(22) Filed: May 23, 2011

(65) Prior Publication Data
US 2012/0299538 A1 Nov. 29, 2012

(51) Int. Cl.
*H01M 10/46* (2006.01)

(52) U.S. Cl.
USPC .......................................... 320/108

(58) Field of Classification Search
USPC .......................... 320/104, 107, 108, 109, 141
See application file for complete search history.

(56) References Cited

U.S. PATENT DOCUMENTS

| 5,311,973 | A | 5/1994 | Tseng et al. |
| 5,889,384 | A | 3/1999 | Hayes et al. |
| 6,184,651 | B1 | 2/2001 | Fernandez et al. |
| 6,943,666 | B2 | 9/2005 | Mooney et al. |
| 7,826,873 | B2 | 11/2010 | Telefus |
| 2001/0012208 | A1* | 8/2001 | Boys ............................... 363/23 |
| 2006/0028176 | A1 | 2/2006 | Tang et al. |
| 2009/0096413 | A1 | 4/2009 | Partovi et al. |
| 2010/0264871 | A1 | 10/2010 | Matouka et al. |
| 2011/0018498 | A1 | 1/2011 | Soar |
| 2011/0050164 | A1 | 3/2011 | Partovi et al. |

OTHER PUBLICATIONS

International Search Report, International Application No. PCT/US2012/038935, Jul. 31, 2012.
Written Opinion, International Application No. PCT/US2012/038935, Jul. 31, 2012.

* cited by examiner

*Primary Examiner* — Edward Tso
(74) *Attorney, Agent, or Firm* — Fay Sharpe LLP

(57) ABSTRACT

A method and apparatus are presented for inductive charging of battery operated devices in a motor vehicle, in which a passive vehicle entry and/or starting system selectively disables or reduces provision of power to a primary coil of an inductive charging station while the passive system communicates with an external user device such as a key fob controller to avoid or mitigate electromagnetic interference.

20 Claims, 7 Drawing Sheets

VEHICLE MOUNTED PERSONAL DEVICE BATTERY CHARGING STATION AND OPERATING METHODS TO AVOID INTERFERENCE

BACKGROUND

Many vehicles provide passive entry and/or remote vehicle starting systems. These systems allow the user to carry a key fob with one or more labeled buttons, and to press a particular button for locking or unlocking one or more vehicle doors, unlocking a hatch or trunk, enabling and disabling anti-theft systems, sounding an alarm, starting the vehicle, etc. The key fob device includes RF communications circuitry and a small battery, and is typically programmed with a unique ID code. The vehicle includes a passive system which communicates with the key fob and verifies that the ID code in the fob is authorized for activating one or more vehicle functions. Some systems also include sensors to detect whether the key fob is located in the vehicle interior or in the vicinity of the vehicle, and the system can alert the user of undesirable events such as attempting to lock the doors while the key fob is inside the vehicle.

Many modern vehicles are also equipped with interfaces for accommodating and interacting with personal communication devices, such as cell phones, PDAs, tablets, laptop computers, portable GPS devices, etc. These portable devices are typically battery-powered, and frequently require recharging. Accordingly, vehicles are often used to charge battery-powered devices, such as by connection of a charger to the vehicle battery through a cigarette lighter adapter. More recently, non-contacting charging stations have been developed in which the battery-powered device includes an inductor coil that can operate as a transformer secondary winding when placed near an energized primary coil, with the charging station including a primary coil and a power supply. When the battery-powered device is positioned on or near the charging station, the primary and secondary coils form a transfer to transfer charging power from the charging station to the battery-powered device.

These inductive charging stations advantageously allow charging of a variety of different user devices without requiring the user to physically connect the device to the charging station by cables or wires. However, inductive charging stations can cause electromagnetic interference (EMI) or radio frequency interference (RFI) at one or several frequencies that could interfere with passive entry/starting system communications. Such interference could prohibit the user from being able to start/stop the vehicle engine and/or cause a failure of the system to warn the driver of an unwanted event like locking the key fob inside the car, etc. Thus, there is a need for improved motor vehicle systems and inductive charging techniques by which battery-powered devices can be inductively charge in a motor vehicle.

SUMMARY

Various details of the present disclosure are hereinafter summarized to facilitate a basic understanding, where this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

Techniques and systems are described by which inductive charging of battery powered user devices is facilitated by mitigating or avoiding unwanted EMI or RFI interference with vehicle-based passive entry and/or remote starting systems. In particular, the disclosed techniques can reduce or eliminate the potential for inductive charging stations interfering with communications between vehicle-based passive entry/starting systems and external key fobs or other external user devices.

Motor vehicles are disclosed which include a passive vehicle system that operates one or more vehicle control units such as a vehicle entry locking system, and an engine starter, etc., as well as an inductive charging station having a primary coil for inductively charging a battery powered device and a power supply to selectively provide AC electrical output power to the primary coil. The charging station has an input to receive an enable/disable signal or command from the passive vehicle system, and the power supply selectively discontinues or reduces provision of power to the primary coil based on the enable/disable signal or command. The passive vehicle system selectively provides the enable/disable signal or command to the inductive charging station to discontinue or reduce the primary coil power during at least a portion of the time period during which the passive system communicates wirelessly with one or more external user devices.

In certain embodiments, the passive system and the charging station are coupled to one another via a communications network and the passive system sends an enable/disable command to the charging station through the network via one or more messages. In certain embodiments, the communications network is a Controller Area Network (CAN) bus, and in other embodiments a Local Interconnect Network (LIN) bus is used, where the communications network may further couple the passive system with other vehicle control units such as a vehicle entry locking system, an engine starter, etc. In certain embodiments, the passive vehicle system and the inductive charging station are both equipped with a Universal Asynchronous Receiver/Transmitter (UART), and the UARTs of the passive system and the charging station are coupled to one another by which the passive system provides the enable/disable command to the charging station via one or more messages. In certain embodiments, moreover, the inductive charging station includes a processor operatively coupled with the power supply to selectively control provision of power to the primary coil, and a communications interface receives one or more messages including the enable/disable command from the passive vehicle system and provides the command to the processor.

In certain embodiments, a switching device is provided in the inductive charging station between a power input of the power supply and a vehicle battery, where the switching device in certain implementations can be a relay, a Field Effect Transistor (FET), a bipolar transistor, or other electrically or electronically actuatable switching device. In certain embodiments, the charging station includes a processor that receives the enable/disable signal or command and provides a control signal to the switching device to selectively control provision of the AC electrical power to the primary coil according to the enable/disable signal or command. In certain embodiments, the passive vehicle system detects wireless communications from one or more external user devices and selectively provides the enable/disable signal or command to the charging station in response to detection of wireless communications from the external device(s). In certain embodiments, the passive system selectively provides the enable/disable signal or command to cause the power supply to discontinue or reduce the primary coil power prior to attempting communications with the external user device(s).

Further aspects of the disclosure involve methods for operating an inductive charging station in a motor vehicle. The method includes selectively providing AC electrical output power to one or more primary coils of an inductive charging station for charging one or more battery-powered devices position near the primary coil(s). The method further includes determining that a passive vehicle system is or will be wirelessly communicating with at least one external user device, and automatically discontinuing or reducing provision of power to the primary coil(s) during at least a portion of a time period in which the passive system is or will be wirelessly communicating with the external device(s).

Certain embodiments of the method further include determining that the passive vehicle system has completed wirelessly communicating with at least one external user device, and automatically resuming provision of electrical output power to the primary coil. Certain embodiments further include detecting wireless communications from the external user device and automatically discontinuing or reducing provision of output power to the primary coil in response to detection of the wireless communications from the external user device. In certain embodiments, moreover the method includes automatically discontinuing or reducing provision of AC output power to the primary coil prior to attempting communications with the external user device(s). In certain embodiments the automatic discontinuation or reduction in the provision of power to the primary coil includes selectively providing an enable/disable signal or command from the passive vehicle system to the inductive charging station.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

Figure 1:
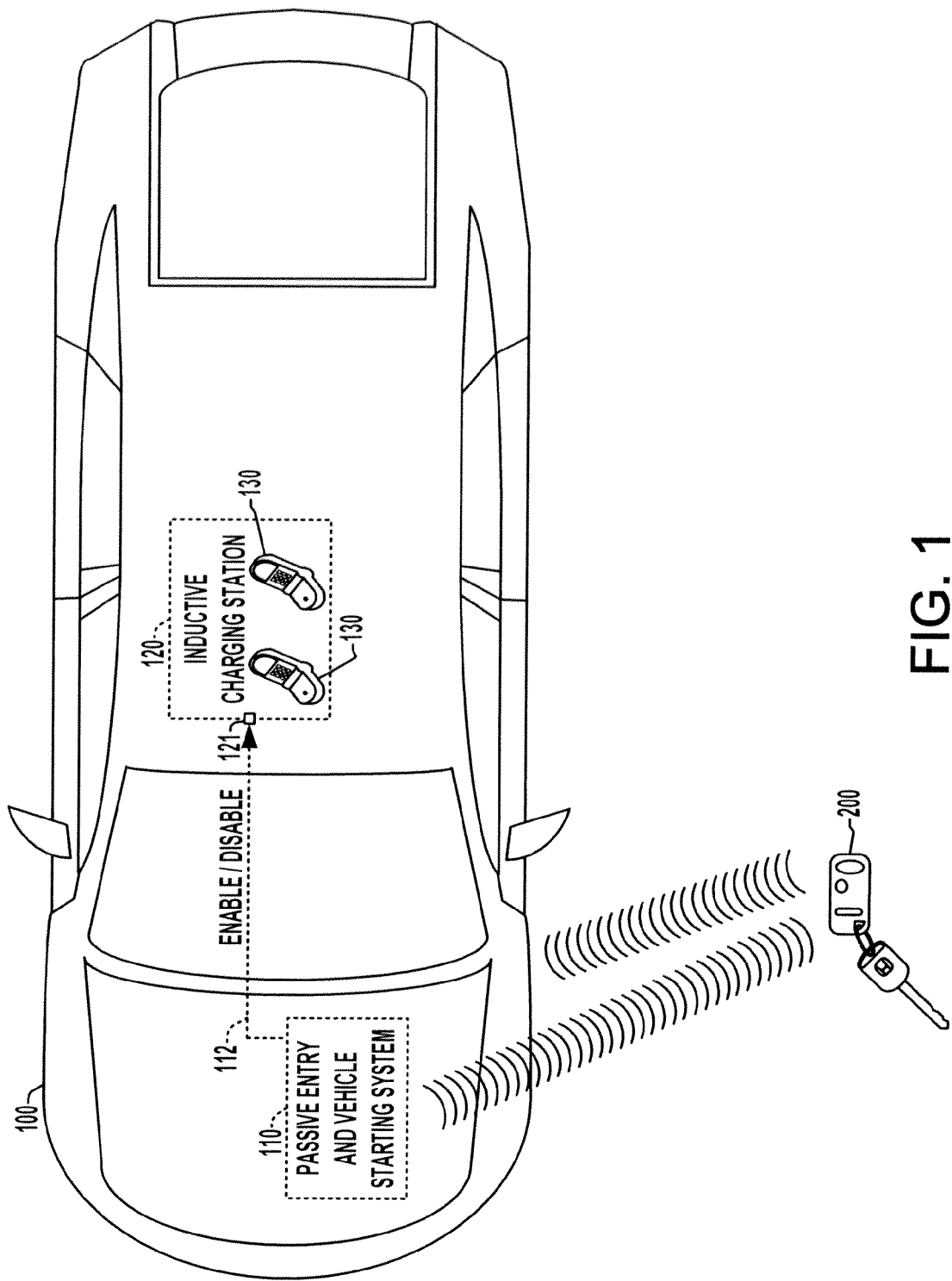
FIG. 1 is a simplified partial schematic top plan view illustrating an exemplary motor vehicle with an inductive charging station for charging battery-powered devices in the vehicle, and a passive entry and vehicle starting system that communicates with external key fob devices and selectively disables or reduces charging power provided by the inductive charging station in accordance with one or more aspects of the present disclosure.

One or more embodiments or implementations are hereinafter described in conjunction with the drawings, where like reference numerals are used to refer to like elements throughout, and where the various features are not necessarily drawn to scale. The disclosure relates to methods and apparatus for operating an inductive charging station of a motor vehicle. Various exemplary embodiments are illustrated and described in greater detail below, and these can be used to advantageously facilitate wireless communications between an external user device such as a key fob and the vehicle in an automated fashion while providing inductive charging facilities in the vehicle for non-contacting charging of battery powered user devices such as cell phones, PDAs, etc.

Figure 2:
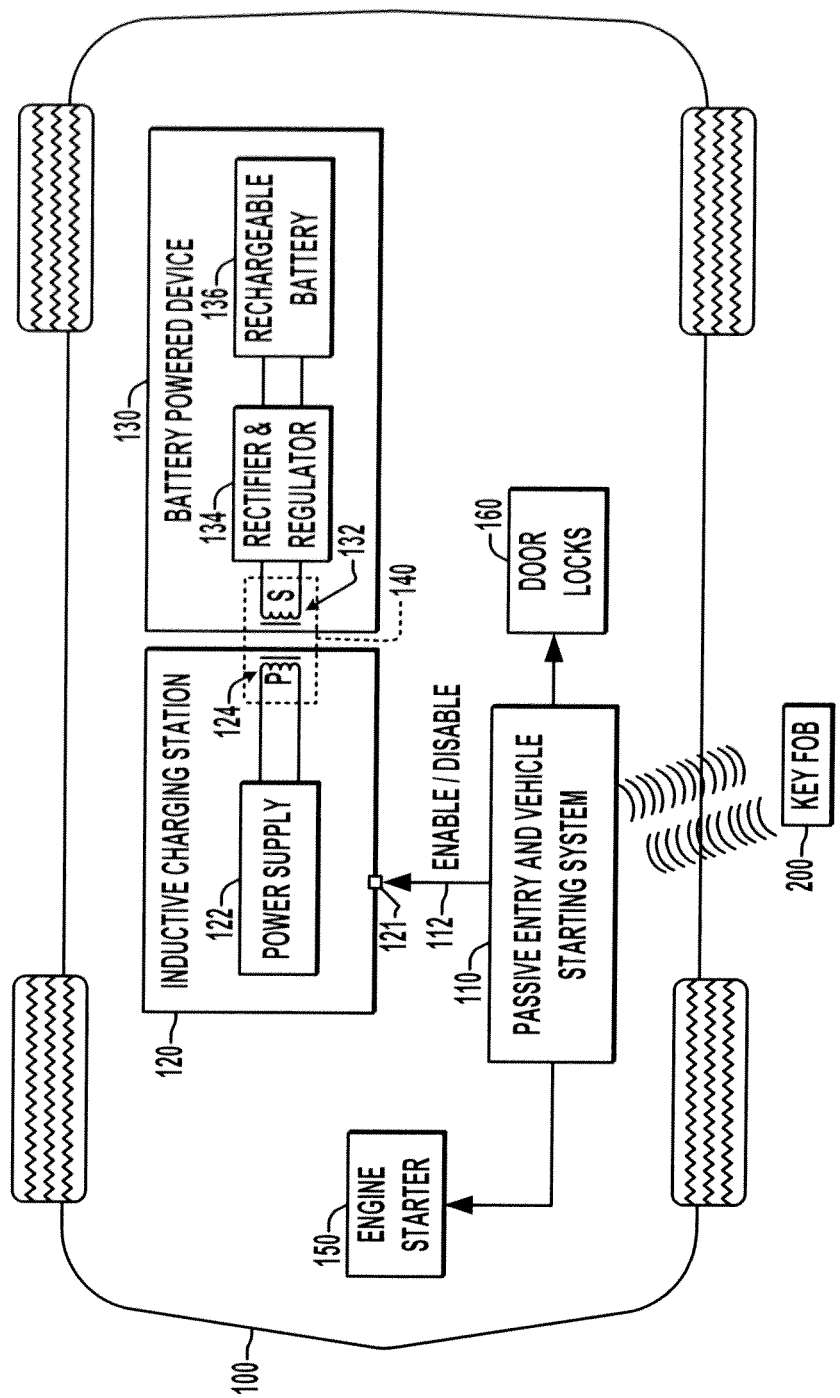
FIG. 2 is a simplified schematic diagram illustrating further details of the inductive charging station and passive system and the motor vehicle of FIG. 1.

Referring initially to FIGS. 1 and 2, and exemplary motor vehicle 100 is illustrated, which can be a car, truck, van, etc., with an onboard propulsion system for transporting one or more passengers and associated cargo, whether an internal combustion engine, electric motor drive system, fuel-cell drive system, hybrid system, or other means of propulsion. As seen in FIG. 1, the vehicle 100 includes a passive entry and vehicle starting system 110 that communicates with an external user device 200 by wireless (e.g., radio frequency) signaling, where the wireless communication between the passive system 110 and the user device 200 can be by any suitable protocol, messaging, and transmission means. In one example, the user device 200 is a key fob having one or more buttons that the user can actuate to perform various functions associated with the vehicle 100, including without limitation locking or unlocking one or more doors, opening a vehicle hatch or trunk, arming or disarming and on-board anti-theft system, performing remote starting of the vehicle 100, actuating an audible annunciator, etc. The passive system 110 in certain embodiments senses the location of the key fob 200 by periodically sending low-frequency or RF signals from a vehicle mounted antenna (not shown), where the antenna can be tuned in a range of 20 to 120 kHz (low-frequency) or at a higher frequency such as 300 to 500 MHz, for example. The passive vehicle system 110 is operatively interconnected to one or more vehicle control units, such as an engine starter 150 and/or a door lock system 160 as seen in FIG. 2, and is capable of enabling and/or operating such units 150, 160 in an automated fashion according to messages received from the key fob 200.

The vehicle 100 further includes an inductive charging station 120 operable to charge one or more battery-powered user devices 130, for instance cell phones, PDAs, portable GPS devices, laptop computers, tablets, notebooks, etc., without having to connect the device 130 with the charging station 120 by cables or wires. The charging station 120 can be any type or form of charging system that provides inductive transfer of energy from the station 120 to the device 130 when the battery-powered device 130 is proximate to the charging station 120. The charging station 120 can be permanently mounted in the cabin and/or trunk of the vehicle 100 so the user can place a personal device 130 on or in the charging station 120 while driving (or while parked, possibly independent of whether or not the engine is running) and charge the device battery 136. In particular, the inductive charging station may include a cradle or other surface upon which a battery-powered device 130 may be placed, or may include form fit receptacle areas to accept a battery-powered device 130 to provide alignment between induction coils of the charging station 120 and of the device 130 for power transfer their between.

As seen in FIG. 2, the charging station includes a power supply 122 with an output coupled to one or more primary coils 124 to provide AC electrical output power from the power supply 122 to the coil 124. The battery-powered device 130, in turn, includes a secondary coil 132 coupled to provide AC electrical current to a rectifier and regulator circuit 134. The circuit 134, in turn, provides DC charging current to a rechargeable battery 136. When the device 130 is placed in proper proximity to the charging station 120, the primary coil 124 of the charging station 120 and the secondary coil 132 of the battery-powered device 130 form a transformer 140 through which alternating current provided from the power supply 122 to the primary coil 124 creates an alternating magnetic field which is magnetically coupled with the secondary coil 132 of the battery-powered device 130. As a result, AC current flows in the secondary coil 132, and the rectifier 134 generates DC charging current to charge the battery 136. The charging station 120, moreover, may be equipped with multiple primary coils 124 for charging one or more battery-powered devices 130.

The power supply 122 may be configured to provide AC output electrical power to one or more primary coils 124 at any suitable frequency, which may in practice overlap or be near to frequencies at which the key fob 200 and the passive system 110 communicate with one another. The communication between the fob 200 and the passive system 110, moreover, can be done in any suitable manner, such as with the passive system 110 periodically sending signals and waiting for acceptable responses. The key fob 200 responds to the passive system 110 and the system 110 determines the location of the key fob 200 based on this response. Alternatively, or in combination, the key fob 200 may send signals when actuated by a user, with the passive system 110 reacting to received signals from the key fob 200 to establish a given communications session. In either case, concurrent operation of the inductive charging station 120 and communication between the passive system 110 and the key fob 200 may lead to electromagnetic interference which could degrade or prevent desired communication between the passive system 110 and the key fob 200. Such interference could prohibit the user from being able to start/stop the vehicle engine or prevent the system 110 from warning the driver of an unwanted event like the user locking the key fob 200 inside the vehicle 100, etc.

In order to address this potential interference, the present disclosure provides an inductive charging station 120 that inductively charges personal devices 130, and which has an input 121 to receive an enable/disable signal or command 112 from the passive vehicle system 110. Accordingly, the provision of AC electrical output power to the primary coil 124 is selectively discontinued or reduced by the vehicle's passive entry system 110 by means of direct control of the charging station's power supply 122 or by a signal 112 or communicated command 112 to the charging station 120. In certain embodiments, for example, before the passive entry system 110 attempts to communicate with the user's key fob 200, the charging station 120 is disabled. When the passive entry system 110 has completed communication with the key fob 200, it automatically re-enables the charging station 120. In this manner, EMI/RFI associated with the inductive charging station 120 can be eliminated while the key fob 200 and the passive system 110 communicate with one another.

In other embodiments, the charging power provided by the power supply 122 to the primary coil 124 is reduced while the passive system 110 and the key fob 200 communicate, so as to reduce the amount of charging-related EMI/RFI. This automatic operation can be done independently of other conditions under which the power supply 122 is otherwise activated. For instance, the power supply 122 may be a simple device that is normally always on, regardless of whether a battery-powered device 130 is placed on or in the charging station 120. Alternatively, the power supply 122 may be normally off, and is activated only when a user initiates charging operation.

The passive vehicle system 110 selectively provides enable/disable signal(s) or command(s) 112 to the inductive charging station 120 to cause the power supply 122 to discontinue or reduce provision of power to the one or more primary coils 124 during all or at least a portion of the period of time in which the passive system 110 communicates wirelessly with the external user device 200. In this manner, full functionality of the key fob 200 is preserved even when the vehicle 100 includes an inductive charging station 120, and even when the power supply 122 provides AC output power to the primary coil 124 at or near a frequency band utilized by the key fob 200 and the passive entry and starting system 110.

Any suitable technique can be used by which the passive system 110 causes the charging station 120 to reduce or stop the provision of power to the primary coil 124. For instance, a simple inductive charging station 120 may be powered by the vehicle's ignition power, and may always be on when the vehicle 100 is being driven. For example, there could be a normally closed FET or transistor or relay or other switching device 129 (see FIGS. 4 and 6 below) in series with the power supply 122 that could be controlled by the passive system 110. If a more sophisticated charger 120 is provided, for instance, having a microprocessor 126 (see FIGS. 3, 5 and 6 below), a message or command could be sent to the charger's processor 126 from the passive system 110 in order to enable/disable the charging station 120 by sending a signal or message including a command over a data bus (CAN, LIN, etc.). Alternatively, as seen in FIG. 5 below, each system 110 and 120 could be equipped with a UART 117, 127 to send an enable/disable command 112 from the passive system 110 to the charging station 120.

Figure 3:
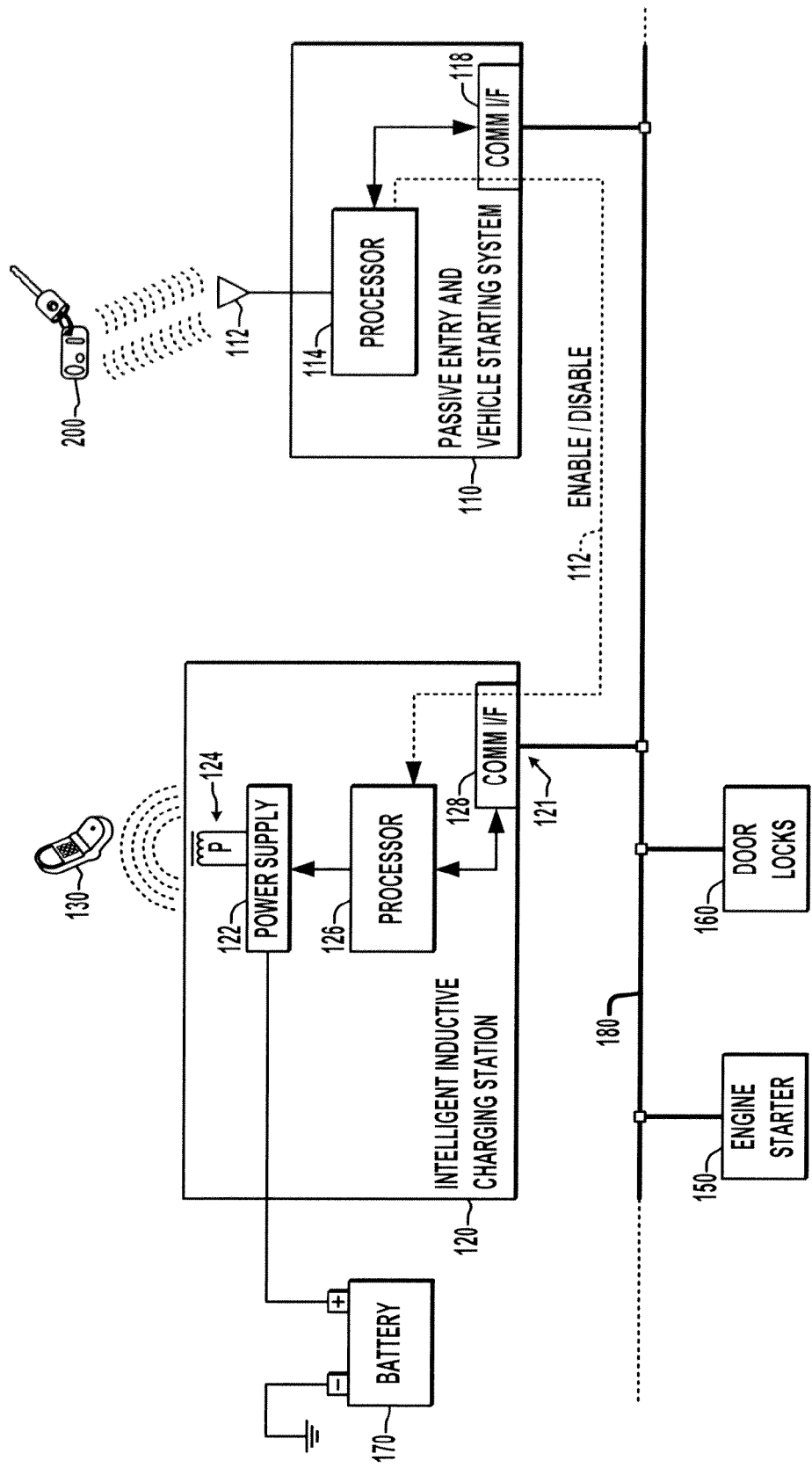
FIG. 3 is a system diagram illustrating an embodiment in which a communications network operatively couples the passive system which the inductive charging station, an automatic door lock system and an engine starter, and the passive system sends enable/disable command by network messaging using a communications interface.

FIG. 3 schematically illustrates an embodiment of the vehicle 100 in which a communications network 180 operatively couples the passive system 110 with the charging station 120 as well as with other vehicle control units including the engine starter system 150 and the door lock system 160. In this example, the input 121 to the charging station 120 is implemented by way of a communications interface 128, and the charging station 120 is an intelligent device including a processor 126 operative to control the power supply 122. As with any processor-based system, suitable memory and programming instructions (not shown) are provided in the intelligent inductive charging station 120, and the functionality implemented by the charging station 120 can be implemented in any suitable hardware, processor-executed software, processor-executed firmware, programmable logic, etc., or combinations thereof, and the functionality of the passive system 110 can likewise be implemented.

In the case of FIG. 3, the processor 126 controls the power supply 122 to selectively generate AC electrical output power to drive the primary coil(s) 124 for inductive charging of one or more battery-powered devices 130 located proximate to the coil(s) 124. The processor 126 may discontinue provision of power from the supply 122 to the coil 124 upon receipt of an enable/disable message 112 the of the communications interface 128, and/or may selectively reduce the amount of power provided by the power supply 122 to the primary coil 124 based on a received enable/disable command 112 by way of a message transmitted through the communications network 180. In certain embodiments, the amount of output power reduction can be predetermined, or may be specified in the enable/disable message 112 sent by the passive system 110 to the charging station 120.

In this configuration, moreover, the passive entry and vehicle starting system 110 also includes a processor 114 and a communications interface 118 coupled with the network 180. In certain embodiments the passive system 110 provides the enable/disable command 112 by way of one or more messages transmitted through the network 180 via the communications interfaces 118 and 128 from the passive system processor 114 to the charging station processor 126 for controlling the power supply 122 in accordance with the command 112. In certain embodiments, a Controller Area Network (CAN) bus 180 is used as the communications network 180. In other embodiments, the communications network 180 can be implemented as a Local Interconnect Network (LIN) bus.

Figure 4:
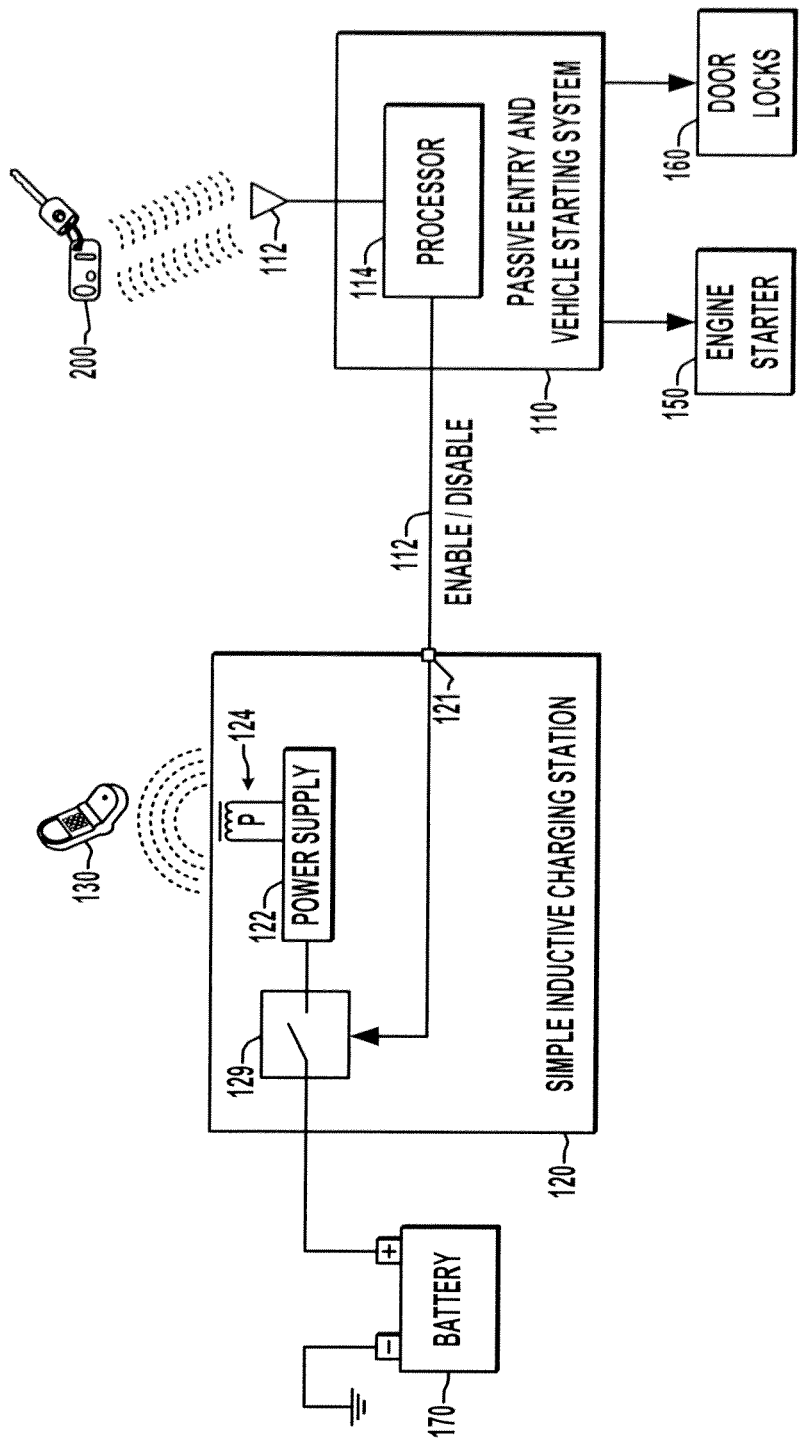
FIG. 4 is a system diagram illustrating another embodiment in which the inductive charging station includes a switching device for selectively connecting or interrupting power from a vehicle battery to the charging station power supply, and the passive system controls operation of the switching device using an enable/disable signal.
Figure 5:
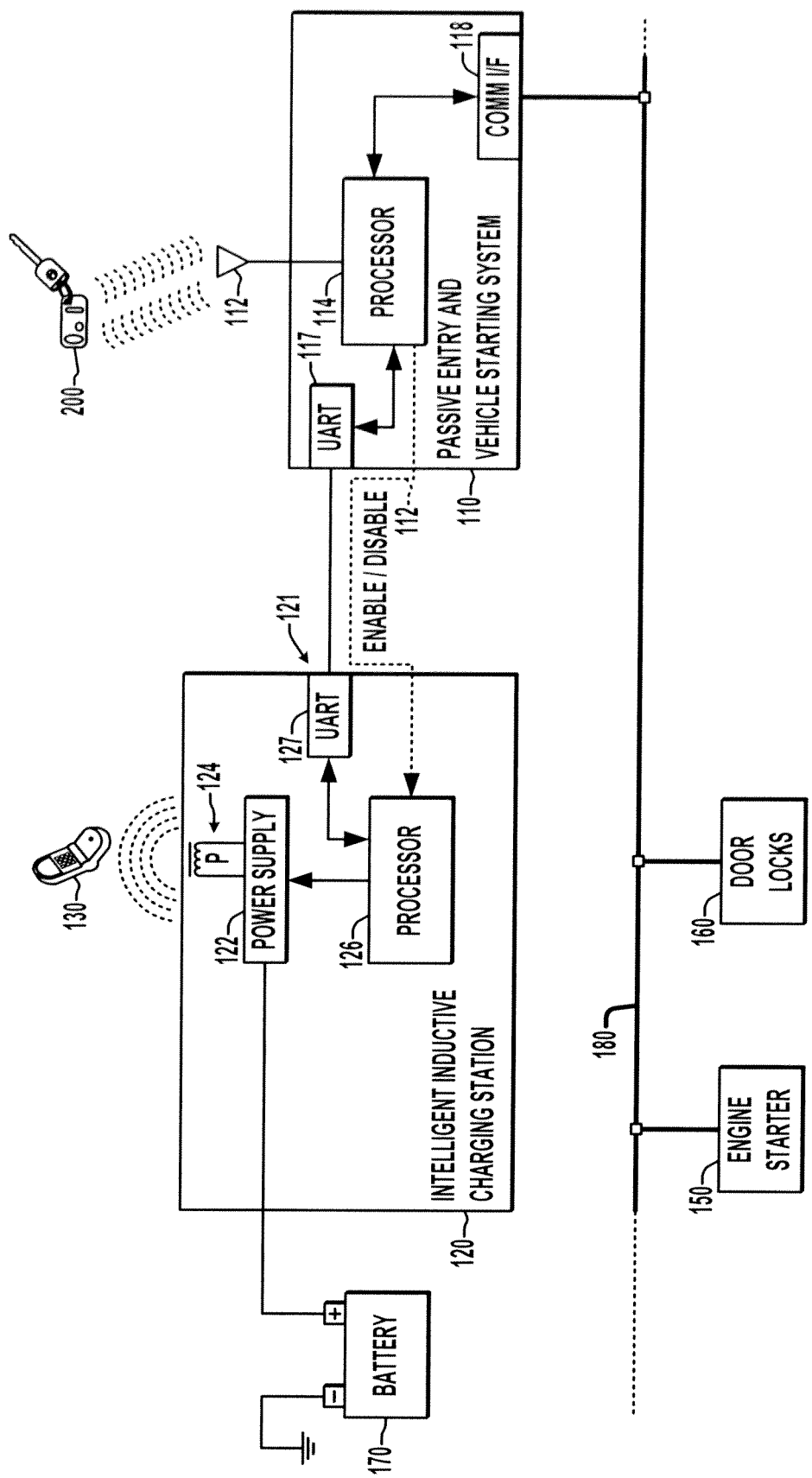
FIG. 5 is a system diagram illustrating yet another embodiment in which the inductive charging station and the passive system each include UARTs for transmission of messages including enable/disable command from the passive system to the charging station.

FIG. 4 illustrates another embodiment in which a more simplified inductive charging station 120 is used. In this case, a switching device 129 is provided in the charging station 120, which is electrically coupled between a power input of the power supply 122 and a vehicle battery 170. The switching device 129 is operative according to an enable/disable control signal 112 provided from the passive system processor 114 via the input 121 to selectively discontinue and/or reduce the amount of power received by the power supply 122 from the vehicle battery 170. In certain embodiments, the switching device 129 can be a relay, with the enable/disable signal 112 optionally being buffered using suitable amplifier or other driver circuitry (not shown) in the inductive charging station 120 in order to control a relay coil of the switching device 129 to selectively open a relay contact connected between the battery 170 and the power input of the power supply 122.

In other embodiments, a semiconductor-based switching device 129 can be used, with the enable/disable signal 112 driving a control terminal of a Field Effect Transistor (FET), a bipolar transistor, or other electrically or electronically controllable switching device 129. In such cases, the passive system 110 can provide the enable/disable signal 112 in such a manner that the switching device 129 selectively discontinues the application of power from the battery 170 to the power supply 122 in order to shut off the application of AC electrical output power to the primary coil 124. Alternatively or in combination, the passive system 110 can provide the enable/disable signal 112 to reduce the amount of power from the battery 170 to the supply 122, thereby reducing (but not completely discontinuing) the application of power to the coil 124.

FIG. 5 illustrates another embodiment, in which an intelligent inductive charging station 129 includes a processor 126 controlling the power supply 122, as well as a UART 127 constituting the input 121 for receiving an enable/disable signal or command 112 (e.g., via a message) by way of a direct connection between the charging station UART 127 and a UART 117 coupled to the processor 114 of the passive system 110. The charging station UART 127 provides the enable/disable command message 112 to the processor 126 for selective discontinuation and/or reduction of the AC electrical output power provided by the power supply 122 to the primary coil 124. In this example, the processor 114 of the passive system 110 may communicate with the vehicle control units 150 and/or 160 by way of a communications network 180 and a communications interface 118 provided in the passive system 110, although not a strict requirement. In this configuration, the UARTs 117 and 127 of the passive system 110 and the inductive charging station 120 are operatively coupled to one another, and the passive system 110 selectively provides the enable/disable command 112 to the inductive charging station 120 through the UARTs 117 and 127 via one or more messages.

Figure 6:
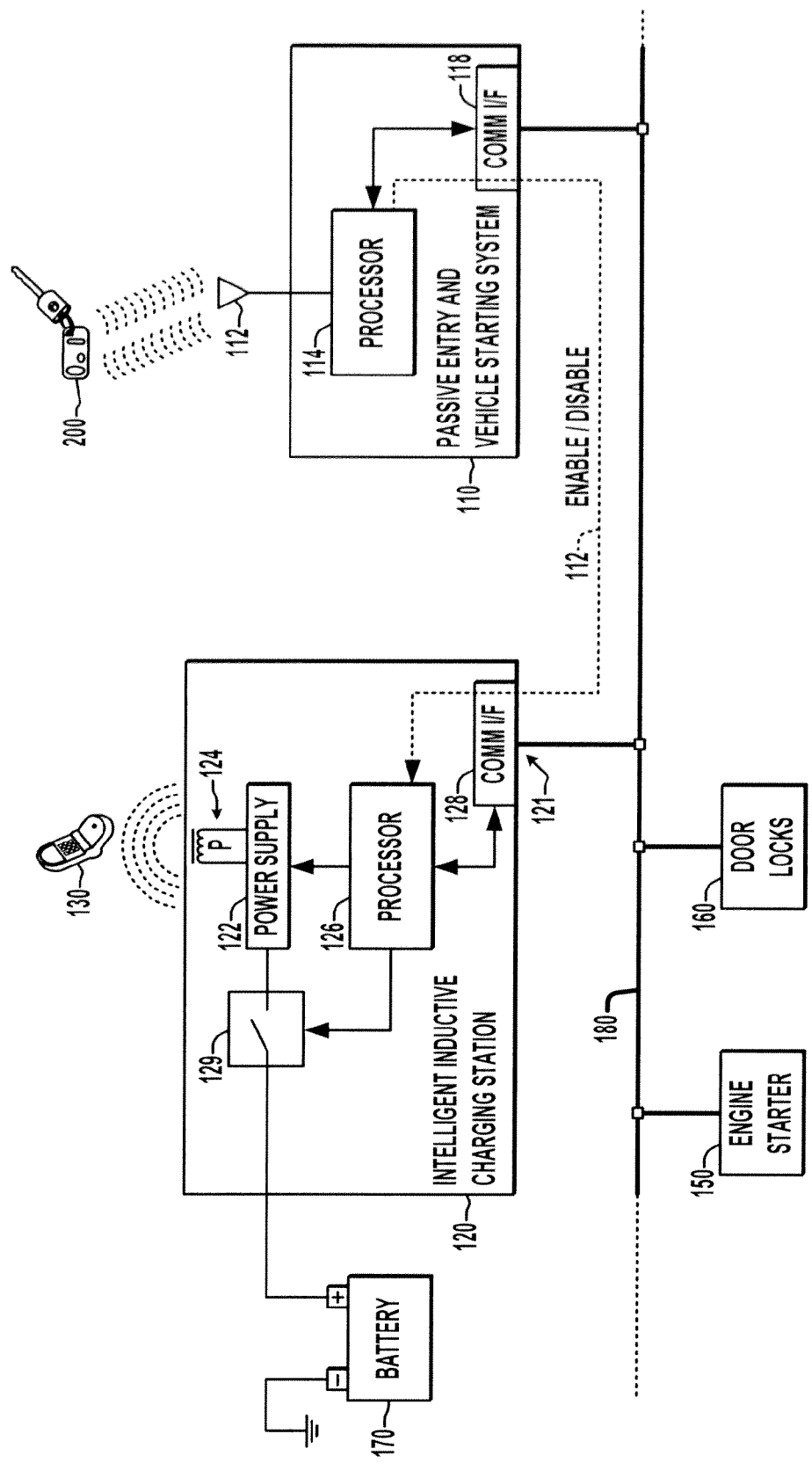
FIG. 6 is a system diagram illustrating another embodiment in which an intelligent inductive charging station includes a processor operating a switching device to selectively control power applied to the power supply according to a received enable/disable signal or command.

FIG. 6 provides another exemplary embodiment in which an intelligent inductive charging station 120 includes a processor 126 that receives an enable/disable signal or command 112 from the passive system 110, and controls a switching device 129 (e.g., relay, semiconductor-based switch, etc.) for controlling the power provided from the vehicle battery 170 to the power supply 122. In this example, the charging station 120 includes a communications interface 128 providing the input 121 by which an enable/disable message 112 can be sent from the passive system 110 through a communications network 180 to the charging station 120. In alternative implementations, the enable/disable command 112 can be provided by UARTs coupling the passive system 110 and the charging station 110 (e.g., as shown in FIG. 5 above), or by other suitable means. In this regard, the processor 126 can operate the switching device 129 to selectively discontinue and/or reduce the amount of output power provided from the power supply 122 to the primary coil 124.

In certain embodiments, the passive system 110 may detect wireless communications from the external user device 200 and selectively provide the enable/disable signal or command 112 to the inductive charging station 120 in order to cause the power supply 122 to discontinue or reduce provision of the AC electrical output power to the primary coil 124 in response to detection of the wireless communications from the external user device 200. In other embodiments, the passive system 110 selectively provides the enable/disable signal or command 112 to the inductive charging station 120 to cause the power supply 122 to discontinue or reduce provision of the AC electrical output power to the primary coil 124 prior to attempting communications with the external user device 200.

Figure 7:
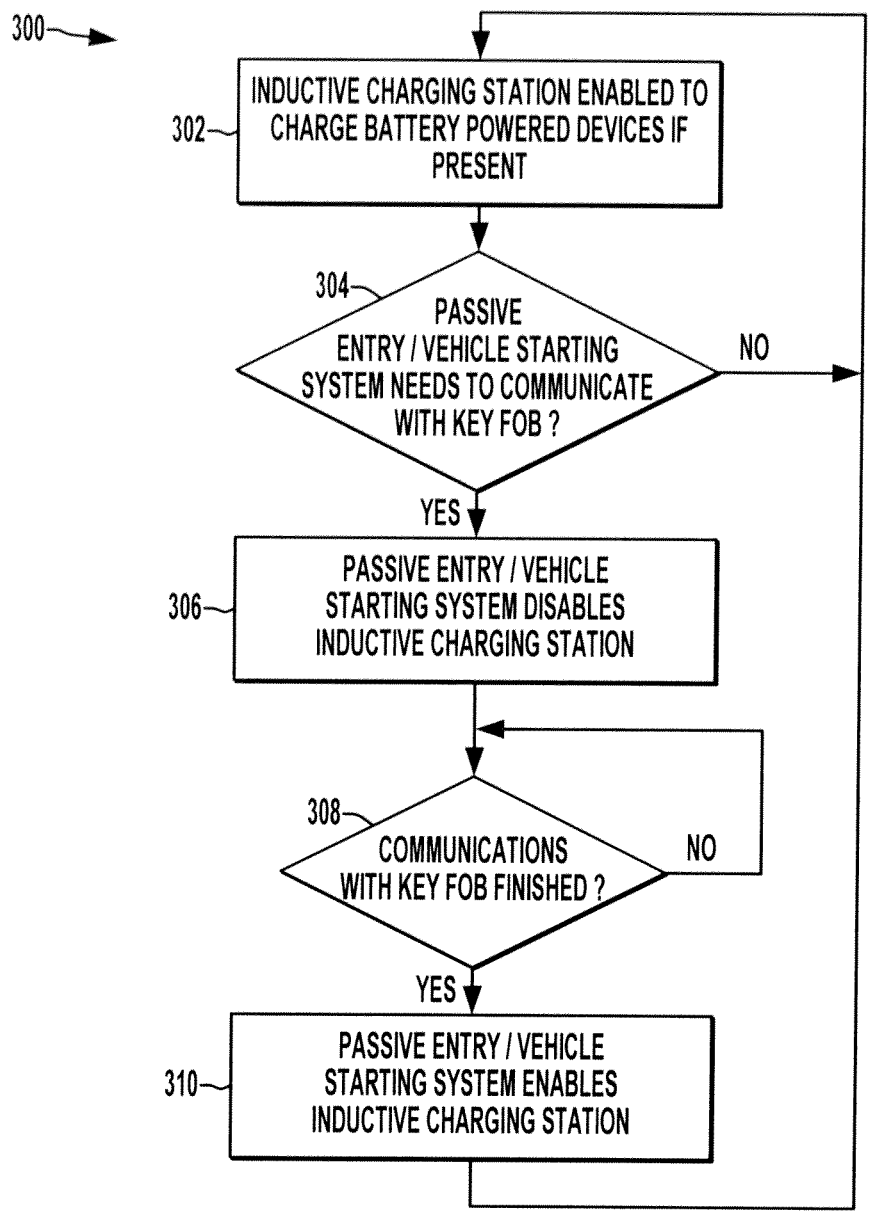
FIG. 7 is a flow diagram illustrating an exemplary method for operating an inductive charging station in a motor vehicle in accordance with the present disclosure.

Referring also to FIG. 7, a method 300 is illustrated for operating an inductive charging station (e.g., charging station 120 in the examples above) of a motor vehicle (e.g., vehicle 100). The method 300 includes enabling the inductive charging station at 302, which can be normally enabled all the time, enabled only when the vehicle ignition system is actuated, or only when one or both of the above conditions exists and one or more battery powered devices are placed on or in the charging station 120. In this manner, AC electrical output power is selectively provided to at least one primary coil (e.g. coil 124 in the charging station 120 above) in the vehicle 100 for inductive charging of at least one battery-powered device 130 positioned near the primary coil 124.

A determination is made at 304 as to whether the passive entry/vehicle starting system 110 needs to communicate with a key fob or other external user device 200. In one implementation, the passive system 110 detects wireless communications from at least one external device 200, and thus determines at 304 that it needs to communicate with the external device 200. In other possible implementations, the passive system 110 may periodically send out messages by wireless communications and wait for responses from any external devices 200 within range, in which case the passive system 110 determines at 304 that it needs to initiate such a communication. In either case, once the passive system 110 determines that it needs to communicate with the external device 200 (YES at 304), the passive system disables the inductive charging station at 306.

In certain embodiments, this disabling at 306 includes automatically discontinuing or reducing provision of AC electrical output power to the primary coil (124) of an inductive charging station 120 located in or near the interior of the motor vehicle 100 during at least a portion of the time period during which the passive system 110 is or will be wirelessly communicating with one or more external user devices 200. In some implementations, this includes completely discontinuing the primary coil power, and in other embodiments the power to the primary coil can be selectively reduced during all or a portion of the wireless communications time period.

A determination is made at 308 as to whether the wireless communications is finished. If not (NO at 308), the selective discontinuance or reduction in the inductive charging station primary coil power is continued at 308. Once the communications is finished (YES at 308), the passive system 110 re-enables the inductive charging station at 310, and the process returns to 302 as discussed above. In this manner, the system automatically resumes provision of the AC electrical output power to the primary coil 124 for charging one or more battery-powered devices in the vehicle charging station 120. In certain embodiments, the automatic discontinuation or reduction in the provision of AC electrical output power to the primary coil 124 can be done by selectively providing an enable/disable signal or command (e.g. 112 as described above) from the passive vehicle system 110 to the inductive charging station 120.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A motor vehicle, comprising:
    a passive vehicle system operative to communicate wirelessly with at least one external user device and to selectively actuate or control at least one of a vehicle entry locking system and an engine starter of the vehicle according to communications received from the at least one external user device; and
    an inductive charging station comprising:
        at least one primary coil operative when energized to form a transformer with a secondary coil of at least one battery powered device proximate the at least one primary coil,
        a power supply with an output coupled to the at least one primary coil, the power supply operative to selectively provide AC electrical output power to the at least one primary coil to inductively charge the at least one battery powered device proximate the at least one primary coil, and to selectively discontinue or reduce provision of the AC electrical output power to the at least one primary coil based on an enable/disable signal or command, and
        an input for receiving the enable/disable signal or command from the passive vehicle system;
    the passive vehicle system being operative to selectively provide the enable/disable signal or command to the inductive charging station to cause the power supply to discontinue or reduce provision of the AC electrical output power to the at least one primary coil during at least a portion of a time period when the passive vehicle system communicates wirelessly with the at least one external user device.

2. The motor vehicle of claim 1, wherein the passive vehicle system and the inductive charging station are operatively coupled with a communications network, and wherein the passive vehicle system is operative to selectively provide the enable/disable command to the inductive charging station through the communications network via at least one message.

3. The motor vehicle of claim 2, wherein the passive vehicle system and the inductive charging station are operatively coupled with a Controller Area Network (CAN) bus, and wherein the passive vehicle system is operative to selectively provide the enable/disable command to the inductive charging station through the CAN bus via at least one message.

4. The motor vehicle of claim 2, wherein the passive vehicle system and the inductive charging station are operatively coupled with a Local Interconnect Network (LIN) bus, and wherein the passive vehicle system is operative to selectively provide the enable/disable command to the inductive charging station through the LIN bus via at least one message.

5. The motor vehicle of claim 2, wherein the passive vehicle system and the inductive charging station each comprise a Universal Asynchronous Receiver/Transmitter (UART), wherein the UARTs of the passive vehicle system and the inductive charging station are operatively coupled to one another, and wherein the passive vehicle system is operative to selectively provide the enable/disable command to the inductive charging station through the UARTs via at least one message.

6. The motor vehicle of claim 2, wherein the vehicle entry locking system is operatively coupled with the communications network, and wherein the passive vehicle system is operative to selectively actuate or control the vehicle entry locking system by messaging through the communications network.

7. The motor vehicle of claim 2, wherein the engine starter is operatively coupled with the communications network, and wherein the passive vehicle system is operative to selectively actuate or control the engine starter by messaging through the communications network.

8. The motor vehicle of claim 2, wherein the inductive charging station comprises:

a processor operatively coupled with the power supply to selectively control provision of the AC electrical output power to the at least one primary coil; and wherein the input comprises a communications interface operative to receive at least one message including the enable/disable command from the passive vehicle system via the communications network and to provide the enable/disable command to the processor.

9. The motor vehicle of claim 1, wherein the passive vehicle system and the inductive charging station each comprise a Universal Asynchronous Receiver/Transmitter (UART), wherein the UARTs of the passive vehicle system and the inductive charging station are operatively coupled to one another, and wherein the passive vehicle system is operative to selectively provide the enable/disable command to the inductive charging station through the UARTs via at least one message.

10. The motor vehicle of claim 1, wherein the inductive charging station comprises a switching device coupled between a power input of the power supply and a vehicle battery, the switching device operative to selectively provide the AC electrical output power to the at least one primary coil and to discontinue provision of the AC electrical output power to the at least one primary coil based on the enable/disable signal or command.

11. The motor vehicle of claim 10, wherein the inductive charging station comprises a processor operatively coupled with the input to receive the enable/disable signal or command, the processor operative to provide a control signal to the switching device to selectively control provision of the AC electrical output power to the at least one primary coil according to the enable/disable signal or command.

12. The motor vehicle of claim 1, wherein the passive vehicle system is operative to detect wireless communications from the at least one external user device and to selectively provide the enable/disable signal or command to the inductive charging station to cause the power supply to discontinue or reduce provision of the AC electrical output power to the at least one primary coil in response to detection of wireless communications from the at least one external user device.

13. The motor vehicle of claim 1, wherein the passive vehicle system is operative to selectively provide the enable/disable signal or command to the inductive charging station to cause the power supply to discontinue or reduce provision of the AC electrical output power to the at least one primary coil prior to attempting communications with the at least one external user device.

14. A method for operating an inductive charging station in a motor vehicle, the method comprising:

selectively providing AC electrical output power to at least one primary coil of an inductive charging station located in or proximate an interior of a motor vehicle for inductive charging of at least one battery-powered device positioned near the at least one primary coil;

determining that a passive vehicle system is or will be wirelessly communicating with at least one external user device; and automatically discontinuing or reducing provision of the AC electrical output power to the at least one primary coil during at least a portion of a time period when the passive vehicle system is or will be wirelessly communicating with the at least one external user device.

15. The method of claim 14, further comprising:

determining that the passive vehicle system has completed wirelessly communicating with the at least one external user device; and automatically resuming provision of the AC electrical output power to the at least one primary coil.

16. The method of claim 15, comprising:

detecting wireless communications from the at least one external user device; and automatically discontinuing or reducing provision of the AC electrical output power to the at least one primary coil in response to detection of the wireless communications from the at least one external user device.

17. The method of claim 15, comprising automatically discontinuing or reducing provision of the AC electrical output power to the at least one primary coil prior to attempting communications with the at least one external user device.

18. The method of claim 14, comprising:

detecting wireless communications from the at least one external user device; and automatically discontinuing or reducing provision of the AC electrical output power to the at least one primary coil in response to detection of the wireless communications from the at least one external user device.

19. The method of claim 14, comprising automatically discontinuing or reducing provision of the AC electrical output power to the at least one primary coil prior to attempting communications with the at least one external user device.

20. The method of claim 14, wherein automatically discontinuing or reducing provision of the AC electrical output power to the at least one primary coil comprises selectively providing an enable/disable signal or command from the passive vehicle system to the inductive charging station.

* * * * *